United States Patent [19]

Shea

[11] 4,336,870
[45] Jun. 29, 1982

[54] TORQUE EXCHANGE COUPLING

[75] Inventor: Robert H. Shea, Bergen, N.Y.

[73] Assignee: Shea Inventive Designs, Rochester, N.Y.

[21] Appl. No.: 97,393

[22] Filed: Nov. 26, 1979

Related U.S. Application Data

[60] Division of Ser. No. 757,249, Jan. 6, 1977, Pat. No. 4,195,721, which is a continuation-in-part of Ser. No. 652,206, Jan. 26, 1976.

[51] Int. Cl.³ ............... F16D 43/18; F16H 33/02
[52] U.S. Cl. ................... 192/105 CF; 74/64; 74/84 R; 74/112
[58] Field of Search ............... 192/105 CD, 105 CE, 192/105 CF, 103 B, 93 R, 103 R, 52; 64/29; 74/64, 84 R, 112

[56] References Cited

U.S. PATENT DOCUMENTS

| | | | |
|---|---|---|---|
| 627,613 | 6/1899 | Goolman | 192/105 CF |
| 1,842,835 | 1/1932 | Miller | 192/105 CF |
| 2,178,657 | 11/1939 | Travnicek | 74/64 |
| 2,218,671 | 10/1940 | Broady | 74/64 |
| 2,232,234 | 2/1941 | Hilliard | 74/64 |
| 2,366,637 | 1/1945 | Mejean et al. | 74/64 |
| 2,593,706 | 4/1952 | Zelewsky | 192/105 CF |
| 3,420,345 | 1/1969 | Kobayashi | 192/103 B |

Primary Examiner—George H. Krizmanich

[57] ABSTRACT

A novel torque exchange coupling for transmitting rotational mechanical power is described. The coupling includes a torque receiving member, a torque transmitting member and means for conveying rotational mechanical power between the torque transmitting and receiving members. Typically, the torque receiving member is a housing, a cam or other suitable structure which has a surface comprising a circuitous track. The linear circumference of the track is undulant with respect to its axis of rotation. The torque transmitting member is any suitable rotatable mounting means such as a rotor which is positioned in a rotational power conveying relationship with the undulant track of the torque receiving member. Alternatively, the function of the torque receiving and torque transmitting members can be reversed. In this regard, the torque transmitting member is a housing, a cam or other suitable structure having a surface comprising a circuitous track, the linear circumference of which is undulant with respect to its axis of rotation. The torque receiving member is any rotatable mounting means such as a rotor which is positioned in a rotational power conveying relationship with the undulant track of the torque transmitting member. Where a rotor is employed as the rotatable mounting means, a preferred means for conveying power between the rotor and the undulant track is a variably extendible member attached to the rotor and typically comprises an arm which is pivotally attached to the rotor in a manner such that it is capable of making contact with the undulant track at any point in its linear course. This member is made variably extendible either by centrifugal force, centripetal force, or mechanical, electrical or hydraulic means. The novel coupling of this invention is highly efficient, is easily maintained, is not significantly affected in operation by the presence of heat, and is capable of operation without its components being in close alignment. It contains few moving parts and is strong, durable, and comparatively inexpensive to manufacture. It can be utilized as a clutch, as a transmission, in a braking application, or in practically any other application where a rotational coupling is indicated.

1 Claim, 18 Drawing Figures

FIG. 3 (SECTION A-A)

TORQUE EXCHANGE COUPLING

This is a division of application Ser. No. 757249, filed Jan. 6, 1977 now U.S. Pat. No. 4,195,721, which in turn is a continuation in part of Ser. No. 652,206 filed Jan. 26, 1976.

BACKGROUND OF THE INVENTION

This invention relates to the transmission of rotational mechanical power by means of a torque exchange coupling.

Of the several types of devices employed for merely transferring rotational mechanical power (as distinguished from devices that modify torque), those used most frequently are dependent upon either friction, e.g., friction clutches and friction brakes, or upon hydraulic action, e.g., fluid couplings. Each of these familiar types of devices has disadvantages. A friction clutch, during the process of coming into engagement, and a friction brake, while it is applied and slipping, generate heat. This heat represents wasted energy and is associated with undue wear and with a corresponding need for frequent repair and replacement. When the amount of heat becomes very great, it may impair the structure of the mechanism. In addition to producing heat in undue amounts, frictional braking devices in the prior art have other faults, viz., fading (when affected by heat or foreign matter on the contact surfaces) and locking. The functioning of frictional devices in the prior art is impaired also when by accident moisture, lubricant, or other foreign matter is present on the surface where friction is designed to operate. A hydraulic coupling generates heat at all times during operation under load, owing to the fact that it does not attain a locked relationship between the rotating parts; rather, the liquid element is constantly sheared by the blades, entailing wasted energy as well as production of heat. Hence, a hydraulic coupling ordinarily requires provision for cooling.

The above-mentioned familiar devices have the further limitation that they operate efficiently and have a reasonable span of useful life only when their component parts are closely aligned.

A friction clutch has additional drawbacks when it is used in transmitting power produced by an internal combustion engine. The drawbacks arise both from the characteristics of the engine and from the characteristics of the clutch. The peculiarities of the engine are (1) that at low velocities it generates only a small part of its rated power, and (2) that it can be adjusted for high efficiency in operation only over a narrow part of its total range of velocities. A friction clutch engages with comparative abruptness. It follows that, when a friction clutch is used in connection with an internal combustion engine, provision must be made (1) to keep the load from straining or stalling the engine at the time of first engagement or whenever the load is severe and the speed slight, and (2) to keep the combined mechanism from being racked by abrupt starting engagement. In motor vehicles, adjustment is made for these difficulties, commonly, either (1) by tuning the engine in such a manner as to heighten its efficiency at very low speeds, whereby its tuning becomes inefficient for high speeds, (2) by providing a considerable variety of gear ratios—typically three or four forward speeds—, or (3) by employing a combination of gear sets and a torque converter.

OBJECTS OF THE INVENTION

It is therefore an object of this invention to provide a novel torque exchange coupling for transmitting rotational mechanical power.

Another object of this invention is to provide a novel torque exchange coupling which is substantially less dependent upon friction to produce engagement between its operative members than are many prior art devices.

It is a further object of this invention to provide a novel torque exchange coupling which in its normal operation generates a relatively small amount of heat and is not adversely affected by the heat so generated.

An additional object of this invention is to provide a novel torque exchange coupling which functions as a speed sensitive clutch.

An additional object of this invention is to provide a novel torque exchange coupling which functions as a braking device for the reduction of speed of rotation of a rotating member of a machine or vehicle.

It is also an object of this invention to provide a novel torque exchange coupling which is capable of supplementing or replacing conventional brakes while reducing the likelihood of brake failure.

Another object of the invention is to provide a novel torque exchange coupling which can be substituted for conventional clutches, fluid couplings, slip clutches, friction plate drives, and the like.

A further object of this invention is to provide a novel torque exchange coupling which is simple, economical, tolerant of slippage for long periods of time, and able to transmit rotational power or resistance thereto with relatively high efficiency.

SUMMARY OF THE INVENTION

The above-mentioned objects and other objects of the invention are accomplished with a novel torque exchange coupling for transmitting rotational mechanical power which includes a torque receiving member, a torque transmitting member and means for conveying rotational mechanical power between the torque transmitting and receiving members. Typically, the torque receiving member is a housing, a cam or other suitable structure which has a surface comprising a circuitous track. The linear circumference of the track is undulant with respect to its axis of rotation. The torque transmitting member is any suitable rotatable mounting means such as a rotor which is positioned in a rotational power conveying relationship with the undulant track of the torque receiving member. Alternatively, the function of the torque receiving and torque transmitting members can be reversed. In this regard, the torque transmitting member is a housing, a cam or other suitable structure having a surface comprising a circuitous track, the linear circumference of which is undulant with respect to its axis of rotation. The torque receiving member is any rotatable mounting means such as a rotor which is positioned in a rotational power conveying relationship with the undulant track of the torque transmitting member. Where a rotor is employed as the rotatable mounting means, a preferred means for conveying power between the rotor and the undulant track is a variably extendible member attached to the rotor and typically comprises an arm which is pivotally attached to the rotor in a manner such that it is capable of making contact with the undulant track at any point in its linear course. This member is made variably extendible either by centrifugal force, centripetal force or mechanical, electrical or hydraulic means. The novel coupling of this invention is highly efficient, is easily maintained, is not significantly affected in operation by the presence of foreign matter, does not generate large quantities of heat, and is capable of operation without being in perfect alignment, axially or angularly. It contains few moving parts and is strong, durable, and inexpensive to construct. It can be utilized as a clutch, as a transmission, in a braking application, or in practically any other application where a rotational coupling is indicated.

DETAILED DESCRIPTION OF THE INVENTION

Figure 1:
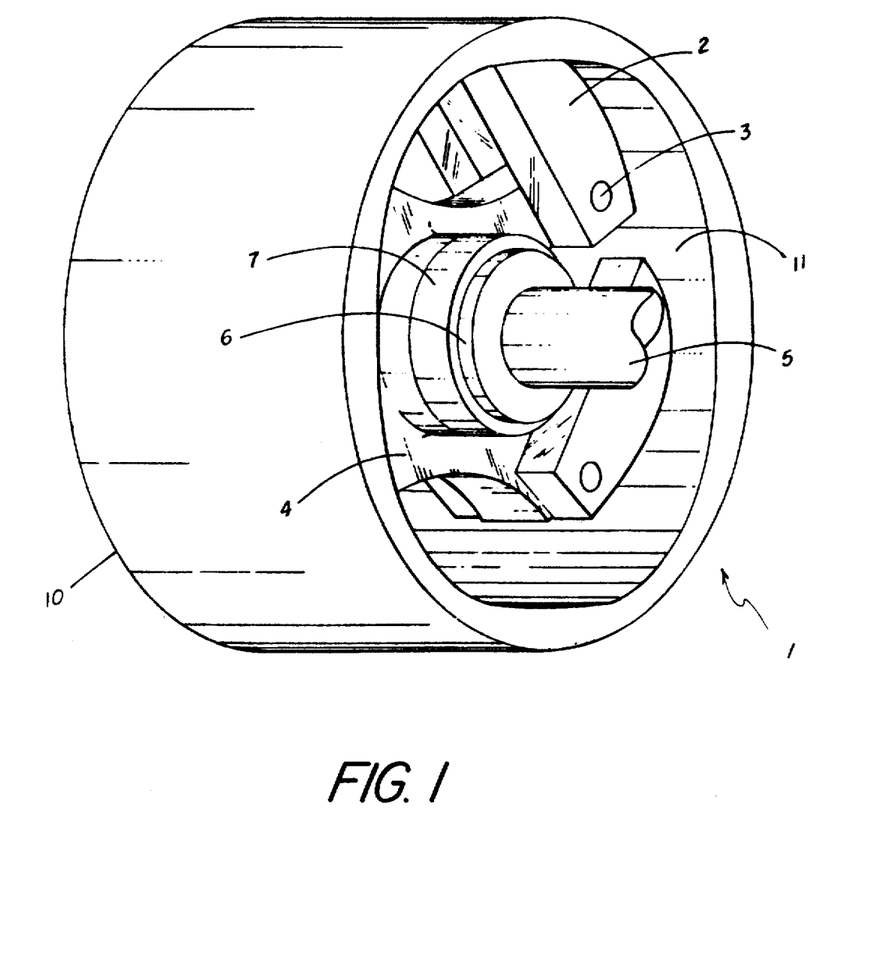
FIG. 1 is a perspective view of the torque exchange coupling of this invention.
Figure 2:
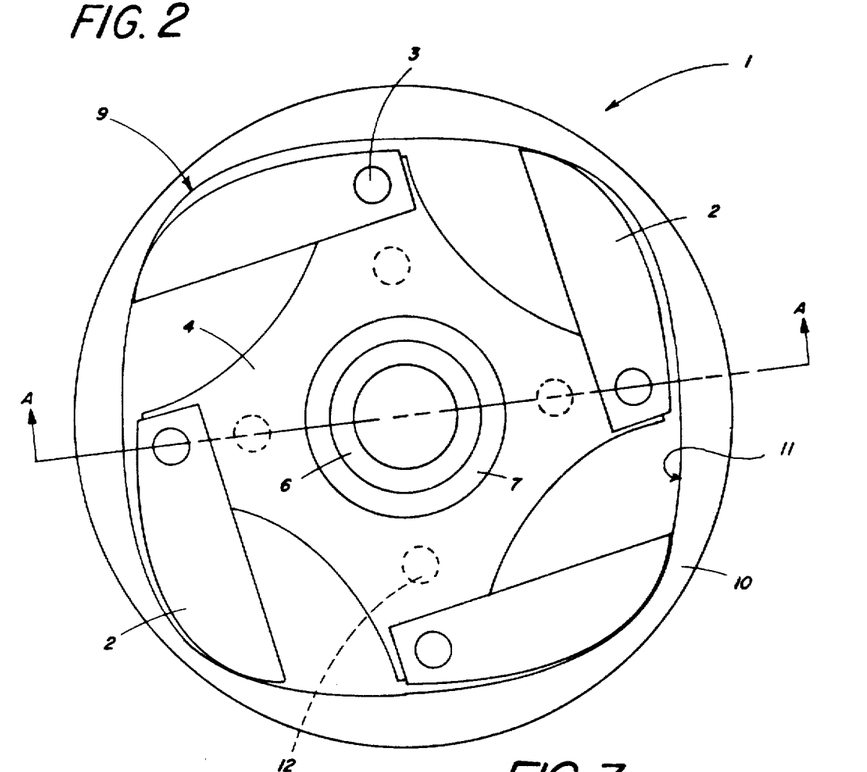
FIG. 2 is a front view of the coupling of this invention.
Figure 3:
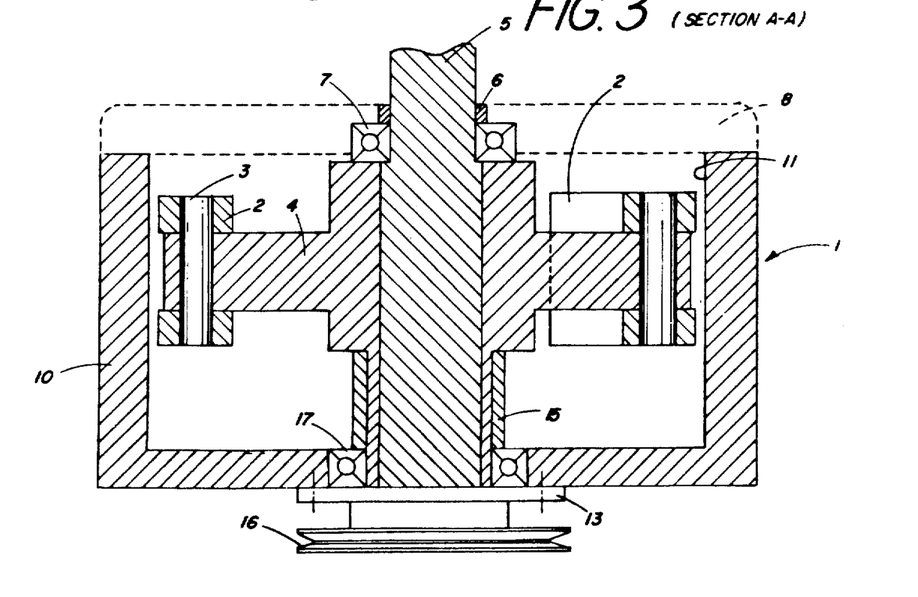
FIG. 3 is a sectional view taken along line A—A of FIG. 2.

Referring now to FIGS. 1, 2 and 3, torque exchange coupling 1 for transferring rotational mechanical power contains a power input means such as input shaft 5', which defines the axis of rotation of the entire assembly and which extends into housing 10. Bearings 7 and 17 permit the free rotation of shaft 5 in relation to housing 10 while seal 6 prevents leakage of lubricants. Bearing cover 13 (FIG. 3) retains bearing 17 in place. A rotatable mounting means such as rotor 4 is axially integrally affixed to input shaft 5 and held in axial alignment by spacer sleeve 15.

At least one rider arm 2 is pivotally (or otherwise extendibly) mounted on rotor 4 by any convenient means, such as pivot pin 3. More than one arm may be employed as shown by four (4) arms in FIG. 2 and two (2) in FIG. 5a. When a single arm is employed, it is frequently desirable to employ a counterweight oppositely disposed to the arm (not shown) to offset any resultant imbalance. The rotor 4 cannot, of itself, extend so as to come into contact with the track hereinafter described. The arm 2 forms a variable circumferential extension of rotor 4 and is capable of making contact with track 11 (described below) at any and all points in its linear course.

Figure 10:
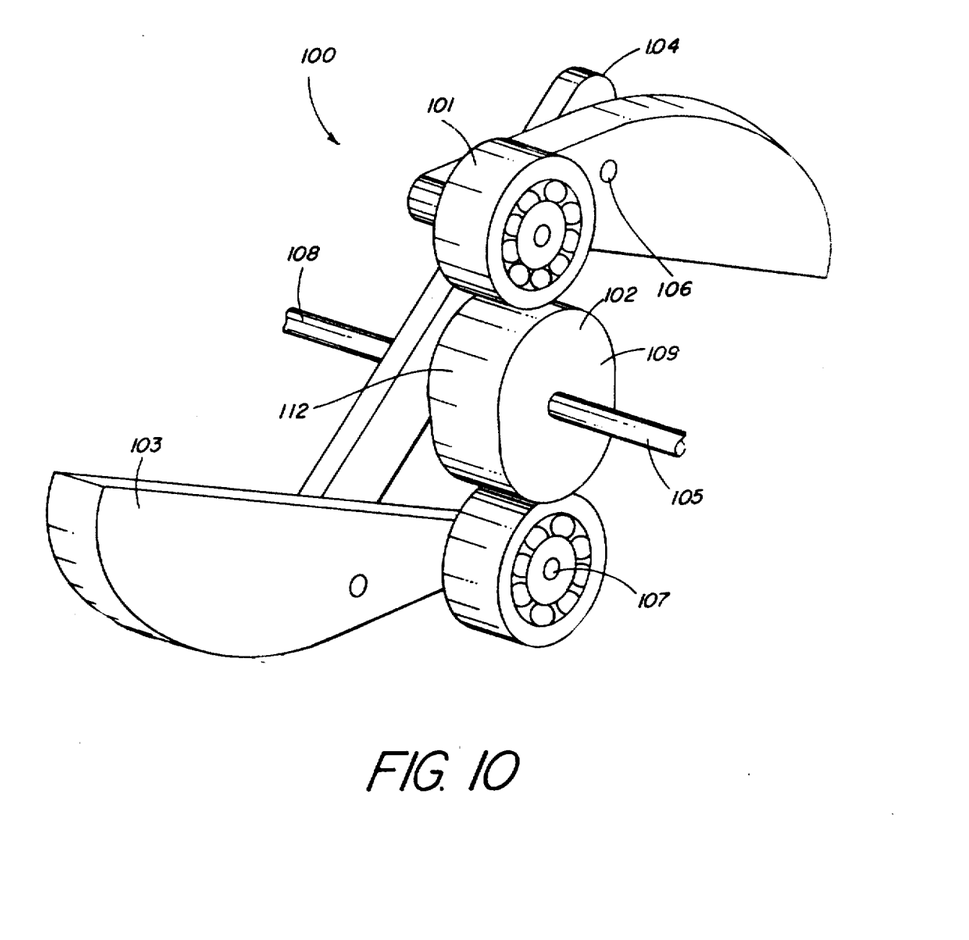
FIG. 10 is a perspective view of another embodiment of the novel torque exchange coupling of this invention.
Figure 11:
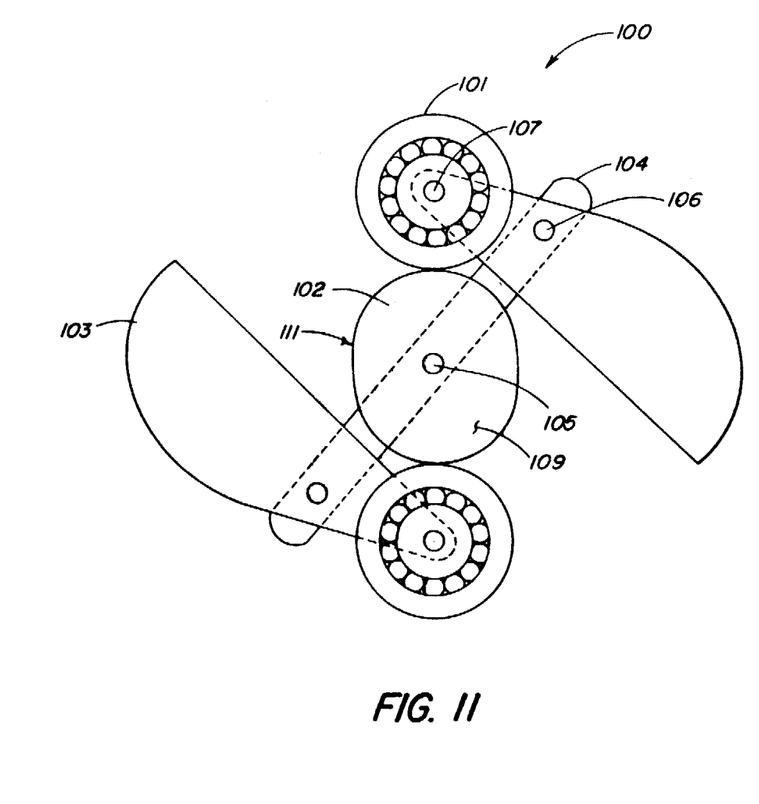
FIG. 11 is a front view of the coupling of FIG. 10.
Figure 12:
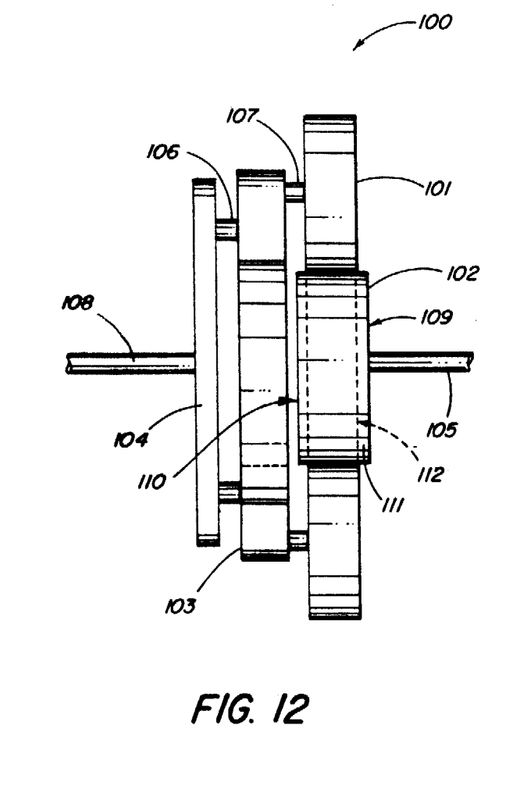
FIG. 12 is a left side view of FIG. 11.

FIGS. 10, 11 and 12 depict an alternative embodiment of the novel torque exchange coupling of this invention. The coupling 100 contains a power input means such as input shaft 108 which similarly defines the axis of rotation of the entire assembly. A rotatable mounting means such as rotor 104 is axially integrally affixed to input shaft 108. At least one rider arm 103 is pivotally (or otherwise extendibly) mounted on rotor 104 by any convenient means such as pivot pin 106. Follower wheel 101 is mounted on rider arm 103 by mounting pin 107 which is positioned on one side of pivot pin 106. Pin 107 serves as an axle and enables follower wheel 101 to rotate freely thereon. The rotation of wheel 101 may be supplemented by the use of bearings 113. Rider arm 103 is counter-weighted by increasing its mass on the opposite side of pivot pin 106 in a manner such that the center of mass of the rider arm 103 and its follower wheel 101 is situated on the side of pin 106 which is opposite wheel 101. Counter-weighting can be accomplished either by the shaping of rider arm 103 or by adding weights to the portion of rider arm 103 which is opposite follower wheel 101. Disc or cam 102 is axially integrally affixed on output shaft 105. Disc or cam 102 contains base surface 109 and 110 and peripheral surface 111. Rotor 104 and cam 102 are positioned in a manner such that follower wheel 101 is capable of making contact with undulant track 112 (described below) positioned on the peripheral surface 111 at any and all points in the track's linear course.

Housing 10 of FIGS. 1, 2 and 3 has on its interior surface a track 11, whose linear course encircles the axis of rotation in a plane substantially perpendicular thereto. Cam 102 of FIGS. 10, 11 and 12 has on its peripheral surface 111 a track 112, whose linear course likewise encircles the axis of rotation of the cam in a plane substantially perpendicular thereto. Each of the undulant tracks 11 and 112 consists of a series of connected arches comprised in a complete circuit. For simplicity of discussion, the following description is in reference to track 11. However, it is to be understood that the same considerations are applicable to track 112. At each and any point in the circuit the tangents constructed to the curvature of each of the two sectors that meet at that point are coincident. Each and every sector comprised in the linear course is bowed so that its concave aspect faces the axial center of the track. For convenience in description, the whole of the linear course may be described as being apportioned between "major arches" and "minor arches", specially defined hereinafter for all purposes of this application. Either a major arch or a minor arch is a sector consisting of two (2) component sectors meeting at a summit point. "Radius", as used herein means the straight line distance from the axial center of the track to a point in the proximate surface of the track. Where the radius to the summit point of the arch is the longest radius of the arch, the radii becoming progressively shorter as one proceeds away from the summit along the component sectors in either direction, the arch is defined, for purposes hereof, as a "major arch". Where the radius to the summit point of the arch is the shortest radius of the arch, the radii becoming progressively longer as one proceeds away from the summit along the component sectors in either direction, the arch is defined, for purposes hereof, as a "minor arch". Since there is no point in the circuit where the curvature of the track undergoes sharp alteration, the point of juncture between a major arch and an adjoining minor arch is arbitrarily located at a point where the radius to that point bisects the angle subtended by the radii to two consecutive summit points. Major arches and minor arches occur alternately in the course. From the foregoing description, it is apparent that the linear course of the track is undulant in form with relation to the axial center of the track. An example of a track having the above described geometric form comprises two (2) elliptical sectors and two (2) circular sectors in an alternating series, the elliptical sectors being the minor arches and circular sectors the major arches. While the foregoing discussion has been with regard to track 11, these same characteristics are present in peripheral track 112.

Figure 6A:
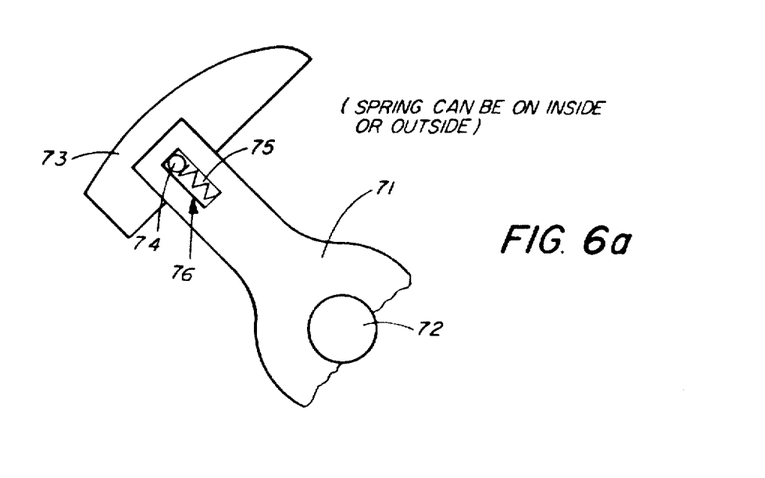
FIG. 6a illustrates a spring loaded arm for the coupling of this invention.
Figure 6B:
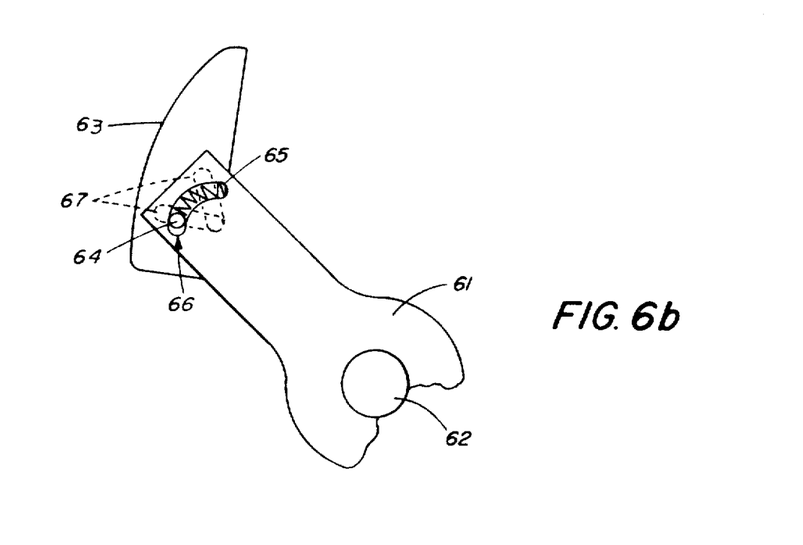
FIG. 6b illustrates an arm having a slot in place of a pivoted attachment, to achieve variable extendibility of the arm.

As previously mentioned in FIGS. 1, 2 and 3, arm 2 is pivotally extendibly attached to rotor 4, which in turn is affixed to input shaft 5. Also, in FIGS. 10, 11 and 12, rider arm 103 is pivotally extendibly attached to rotor 104 which in turn is affixed to input shaft 108. Other means of providing extendibility may be used, in conjunction with or in place of any of the shown pivoting means. The force for extending arm 2 or arm 103 may be entirely centrifugal, centripetal, hydraulic or mechanical or any combination thereof. FIGS. 6a and 6b illustrate modifications usable with track 11. FIG. 6a includes input shaft 72 having rotor 71 affixed thereto. Arm 73 is pivotally attached to slot 76 in rotor 71 by pin 74. In this embodiment, the extendibility of arm 73 is additionally controlled by the movement of the arm in slot 74 which is dependent upon the tension of spring 75. Thus, the total force applied by arm 73 to track 11 can be modified by varying the tension of spring 75, one end of spring 75 being attached to pin 74 and the remaining end to slot 76 nearest input 72. FIG. 6b illustrates slot 66 which is formed so as to facilitate angular movement of arm 63. Pin 64 is maintained in the desired position by means of spring 65. Alternate slots 67 can be provided to allow for additional angulation between the arm and track. The arrangement of FIG. 6b is especially suitable where an acceleration responsive or one-way clutch is desired. Those skilled in the art will readily recognize that similar arms are useful with track 112 by changing the center of mass of the arm and providing a follower wheel.

Figure 9A:
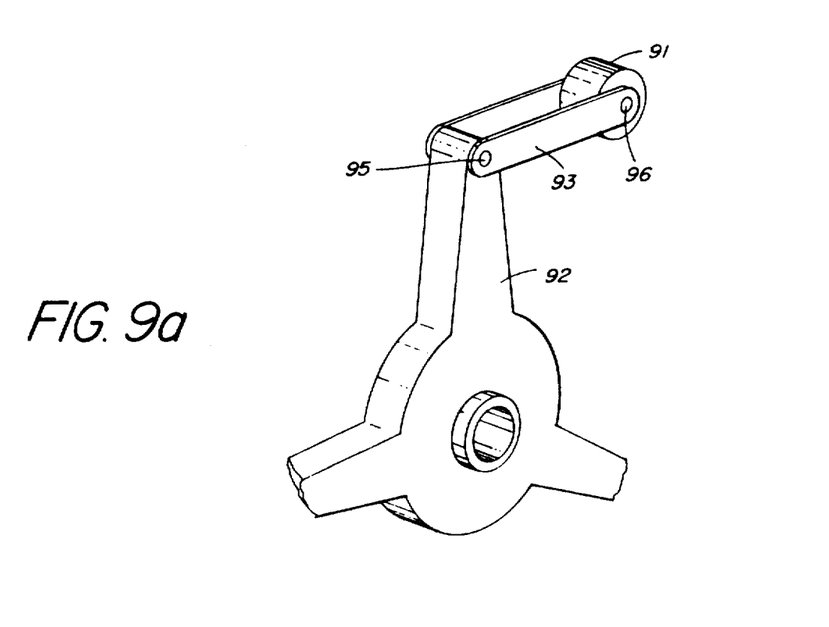
FIGS. 9a, 9b and 9c illustrate various modifications of the rider arm assembly of this invention.
Figure 9B:
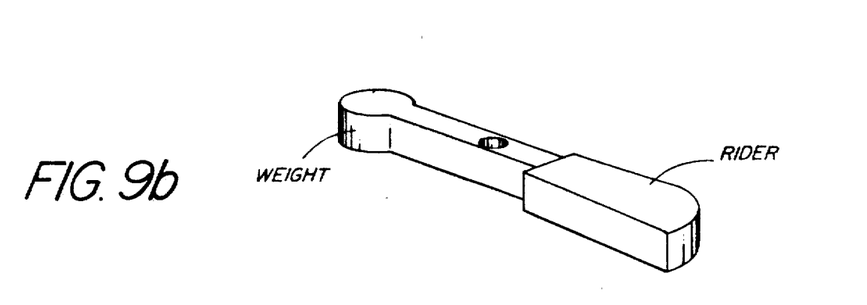
Figure 9C:
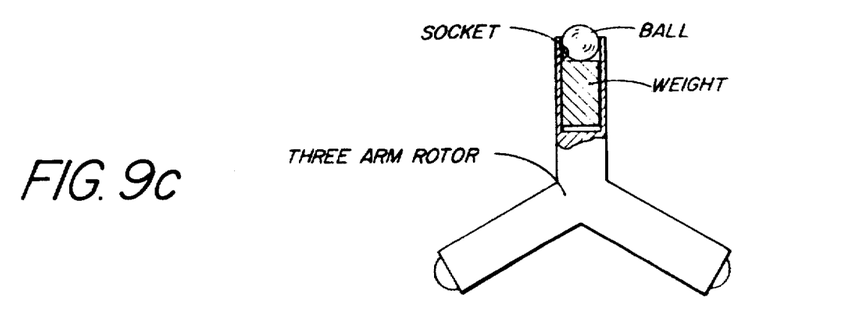

Rider 2 of FIG. 1, 2 or 3 can be modified extensively to meet the requirements for a particular use. In FIG. 9a, the end of rider 93 contains a roller 91 to facilitate its movement along the surface of the track. In this embodiment roller 91 is attached by pin 96 to rider arm 93 which in turn is attached by pin 95 to rotor arm 92. Roller 91 contacts the surface of the track contained within the housing. In FIG. 9b the rider is counterbalanced by a weight positioned on the opposite side of the point of attachment to the rotor. Such counterbalancing changes propulsive characteristics. FIG. 9c illustrates a three (3) armed rotor wherein the end of each arm contains a weight and a ball in a socket. As the speed of the rotor is increased, centrifugal force causes the ball and weight to be thrust outward and the ball forced into contact with the surface of the track. Various other constructions of the rider assembly can be designed by those skilled in the art to meet the need for the intended use.

The propulsive operation of the coupling of FIGS. 1, 2 and 3 is accomplished by connecting the exterior end of input shaft 5 to a source of rotational power, such as a gasoline or electric motor. The exterior end of the output sheave 16 of FIG. 3 is connected to a resistant rotational object, the rotation of which is the work to be accomplished such as a rotary pump or the propeller shaft of a motor vehicle. As rotational power is applied to input shaft 5, typically in gradually increasing amounts, the mechanism goes through three (3) stages of operation. In the first stage, arms 2 move upon track 11 with a tendency to be kept in contact with track 11 by centrifugal force and with some tendency to produce rotation of the housing 10, but with force insufficient to achieve propulsion. For practical purposes, the mechanism may be described as being "disengaged" in this stage. In the second stage, arms 2 move upon the track 11 at greater speed and exert enough centrifugal, sliding frictional, and inertial forces against the track 11 to produce some rotation of housing 10 but a rate of rotation less than that of input shaft 5. In the third stage, as a result of the speed of rotation of the housing reaching the speed of rotation of the rotor, centrifugal, inertial and frictional forces applied by arms 2 to track 11 cause the housing and rotor assembly to become locked and turn integrally. By appropriately regulating the rotational speed at which power is introduced or resistance is opposed, the coupling may be held in either its first (disengaged), second (partially engaged), or third (locked) stage. Where there is an increase in resistance after the coupling attains the third (locked) stage, it may be relegated back to the second stage, with slippage occurring again between arms 2 and track 11. This slippage permits the power source and input shaft 5 to speed up, whereby the mechanism tends to reattain the third (locked) stage without external interference. This cycle of stages may be repeated indefinitely. A similar cycle may occur between the first and second stages. In consequence, under most conditions, a motor connected with a work load in the described manner will not readily become stalled. The transition from the second (partially engaged) stage of operation of the third (locked) stage of operation involves an alteration in mode of operation, in that motion of arms 2 upon track 11 ceases and the sliding frictional and inertial forces cease to operate. In contrast, the transition from the first stage of operation to the second stage does not involve any alteration of mode of operation, in that sliding frictional and inertial forces are operative throughout both of these stages. The first two (2) stages are in a sense a single phase; however, the second stage is distinguishable from the first stage in that at a certain point the sum of the propulsive forces becomes greater than the resistance and there results a transition from non-propulsion to propulsion.

The propulsive operation of the coupling of FIGS. 10, 11 and 12 involves the same principles and is similar to the operation of the coupling of FIGS. 1, 2 and 3. Input shaft 108 is connected to a source of rotational power, such as a gasoline or electric motor which causes input shaft 108 and rotor 104 to rotate. The rotation of rotor 104 in turn causes the portion of rider arm 103 on the side of the pivot pin 106 where the center of mass of the arm is located (opposite the side of pivot pin 106 where follower wheel 101 is located) to move outwardly as a result of centrifugal force. The other end of rider arm 103 moves inwardly forcing follower wheel 101 against track 112 situated on the peripheral surface 111 of cam 102. As rotational power is applied to input shaft 108 in gradually increasing amounts, the coupling goes through the three (3) stages of operation previously discussed. In the first stage, follower wheel 101 moves upon track 112 with a tendency to be kept in contact therewith by centrifugal force and with some tendency to produce rotation of cam 102 but with sufficient force to achieve propulsion. In the second stage, wheel 101 moves upon track 112 at greater speed and exerts enough centripetal and inertial force thereto to produce some rotation of cam 102 but at a rate of rotation which is less than that of input shaft 108. In the third stage, as a result of the speed of rotation of cam 102 reaching the speed of rotation of the input shaft 108 and rotor 104, centrifugal, inertial and frictional forces applied by follower wheels 101 to track 112 causes the cam 102 and rotor 104 to become locked and turn integrally. By regulating the rotational speed at which power is applied, the coupling may be maintained in either its first (disengaged), second (partially engaged) or third (locked) stage. As in the case of the coupling of FIGS. 1, 2 and 3, the coupling of FIGS. 10, 11 and 12 can move back and forth between stages depending upon the load or resistance placed on the coupling.

While follower wheel 101 is exemplified in FIGS. 10, 11 and 12 for use with the coupling decribed therein, those skilled in the art will readily recognize that other structures may be used to accomplish the same or a similar result. For example, a shoe designed to slide along track 112 can be used in place of wheel 101 which rolls along track 112. The particular structure selected will be somewhat controlled by the manner in which the coupling is utilized. It will be noted that even in a primarily propulsive application, such as the employment of the device as a clutch in a vehicle powered by an internal combustion engine, any embodiment of the invention has in some degree the ability to transmit resistance. Thus, if the vehicle is propelled at considerable speed and the device attains its third, locked stage of operation and engine power is then sharply reduced, there will be "compression braking" until the speed of rotation of the device is diminished to the point where it relapses into its second stage of operation, and there will become lesser amount of compression braking even in that stage.

In many embodiments, it is essential to maintain a lubricant on the surfaces where contact occurs between arms 2 and track 11 in order to avoid undue wear. It has been found that liquid lubricant efficiently protects the slipping components when an undulant track is used, whereas it ordinarily does not do so, and rapid wear ensues with slippage, when a geometrically circular track is used. Thus, a distinct advantage achieved by the employment of an undulant track in the present invention is the maintenance of efficient lubrication throughout all stages of operation. In practical operation, sliding friction results from the shearing of the lubricant and not from the structural parts rubbing directly against each other. Although the friction so produced may contribute to propulsion, its contribution is minor, compared with the effect of inertia. The use of lubricant and the maintenance thereof by means of the undulant shape of the track minimize component wear and distribute heat generated in the first and second stages of operation. As an additional advantage, a fluid lubricant produces additional torque during the first and second stage. In the third (locked) stage of operation virtually no heat or component wear whatsoever is generated; and the advantage so obtained is significant from a standpoint of achieving operating efficiency, preserving the integrity of the structure of the mechanism, and reducing the need for cooling devices. Even in the stages in which heat is produced, the operation of the mechanism is not ordinarily impaired, since the quantity of heat produced is generally not enough to damage the structure. Moreover, for practical reasons, the device is ordinarily constructed of strong, solid materials such as metals. The presence of moisture and/or other foreign materials, unless massive in size or quantity, usually has no effect upon the operation or structural integrity of the coupling, as contrasted with the prior art devices referred to above.

As previously stated, a lubricant is essential in many embodiments of the invention. It is possible to minimize or even to eliminate the requirement of a lubricant, at least liquid lubricant, by using a device such as a roller on a pivot located at the tip of the arm attached to the mounting means. Also, the need for lubricant is minimized for the coupling of FIGS. 10, 11 and 12 because of the rotational movement of follower wheel 107. The operation of the invention does not require that the torque receiving member be static when the torque transmitting member is caused to operate upon it. The receiving member may be static or rotating in agreement with or oppositely to the transmitting member. The novel coupling can be used to do the work of a clutch or a transmission in any application where the immediate power source is rotational and the immediate power product is to be rotational. In its third stage, the device incidentally functions as a fly wheel.

When the power source is reversible, the rider arms or their manner of operation may be varied so that the device will transmit power in either direction of rotation. When the power source is unidirectional, the coupling may be combined with reversing gearing, to be engaged at the option of the operator. Whether the power source is unidirectional or reversible, it may be used in combination with any type of automotive transmission including sliding gear, automatic, hydraulic, or other types.

In addition to the above-mentioned uses, the coupling can also be used as a braking device. Thus, when the housing or cam is connected in a fixed relation to a nonrotating body, and the rotor and arms are connected so as to rotate integrally or otherwise responsively to a rotating body, the slowing of whose rate of rotation is the object to be accomplished, the rotating body will be restrained in its operation. Inasmuch as most braking applications have to do with vehicles which must ultimately be stopped, the elementary coupling of this invention is useful to reduce the velocity of such vehicles but not to bring them to a complete stop. Hence, the coupling is not, of itself, a "brake" in the ordinary acceptance of the term.

For braking purposes, the positioning of parts may be reversed, i.e. the housing or cam may be attached integrally to the rotating object to be restrained and the rotor and arms may be attached to a non-rotating body. In such an embodiment, there is no centrifugal force to thrust the arms outward with respect to the mounting means. Hence a mechanical, hydraulic, magnetic, or other device must be superadded, to move the extendible arms centrifugally and to reverse such movement. In braking applications, devices to effect total release from braking operation must be added. Different releasing means will generally be employed, depending upon which member is attached to the rotating object body and which member is attached to the nonrotating body.

When used in a braking application, the device has an advantage over a conventional friction brake in that it can be designed not to lock the object body, where extension of the arms is dependent upon centrifugal force alone. In such a braking application, the device does not attain its third, locked stage of operation. Thus, in such a braking application, where locking is undesirable, the device does not lock whereas in a propelling application, where locking is desirable, the device locks. The advantage of not locking in a braking embodiment may be absent if the embodiment contains means other than or in addition to centrifugal force to compel extension of the arms.

Figure 4A:
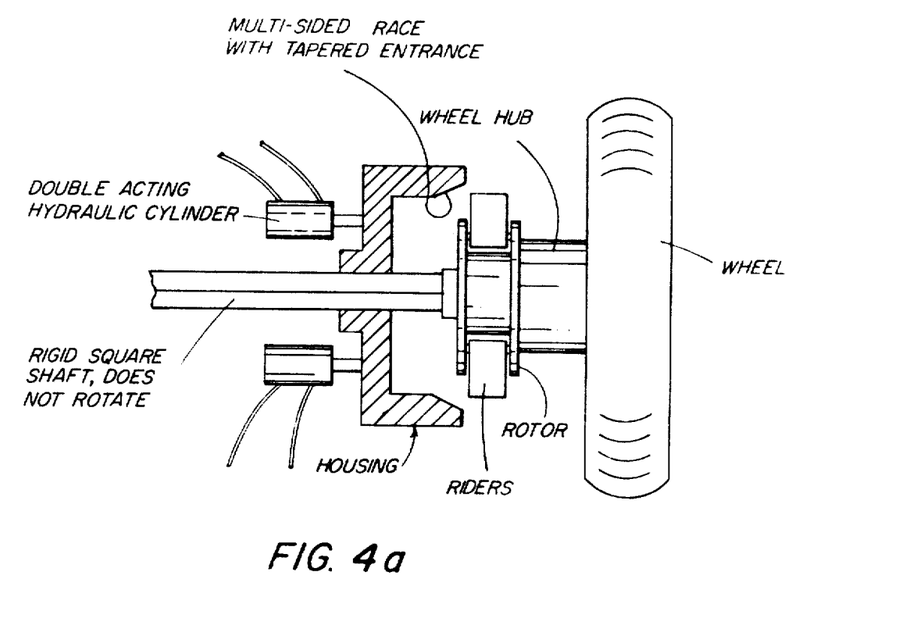
FIGS. 4a, 4b, 4c, 5a and 5b all illustrate various types of brakes using the coupling of this invention.
Figure 4B:
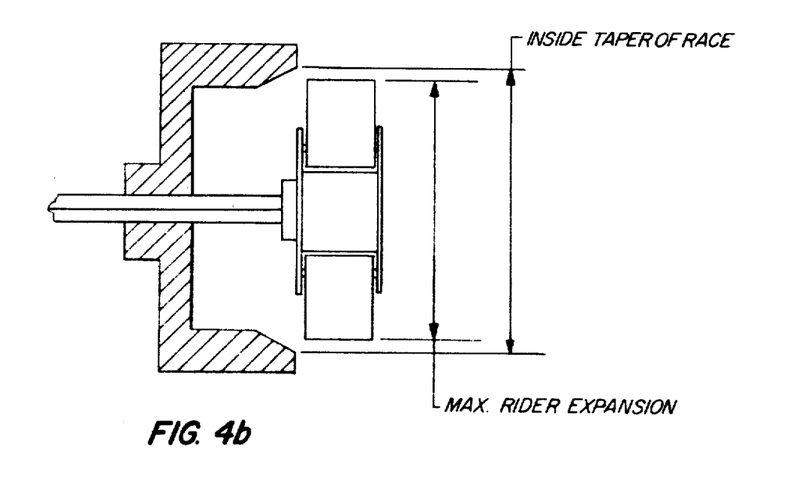
Figure 4C:
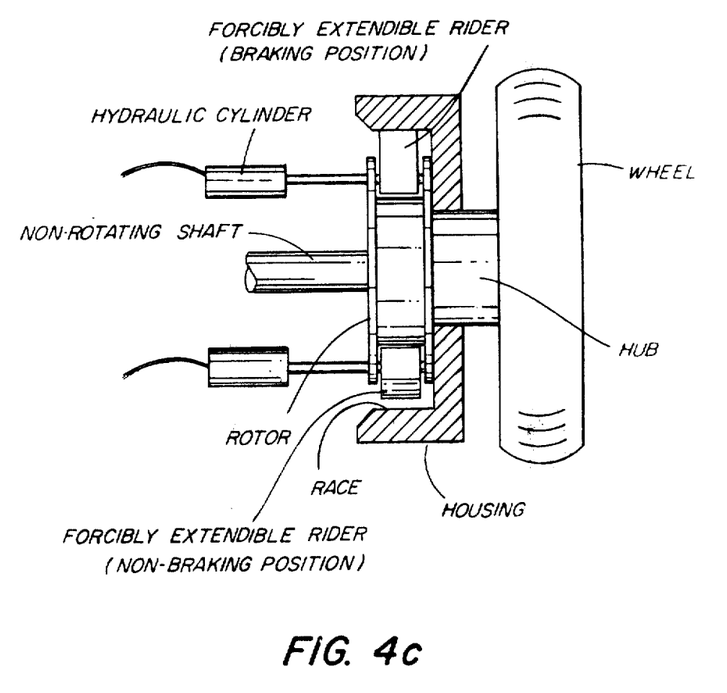

FIGS. 4a, 4b, 4c, 5a and 5b illustrate several different embodiments for use of the device in braking applications. In FIG. 4a, the housing containing a race with a tapered entrance is fixed to a nonmovable axle housing. The riders are pivotally attached to a rotor which in turn is attached to the rotating hub of the wheel. When it is desired to brake, the hydraulic cylinders force the housing outward causing its race to contact the riders. Entry of the riders into the housing is facilitated by the tapered entrance to the race. As shown in FIG. 4b, the riders in their extended position fit within the outer dimension of the tapered race. When the velocity of the wheel is slowed sufficiently, the reduction of centrifugal force causes the riders to assume a nonextended position. In FIG. 4c similar results are obtained by reversing the parts. In this embodiment, the rotor is fixed to the nonrotating shaft and the housing and race are attached to the hub of a rotating wheel. When it is desired to slow the vehicle, the hydraulic cylinder causes the rider arms to become extended whereby they contact the race. As previously mentioned, the rider arms may be thrust outward by mechanical, magnetic or other means as an alternative to the hydraulic means mentioned above.

Figure 5A:
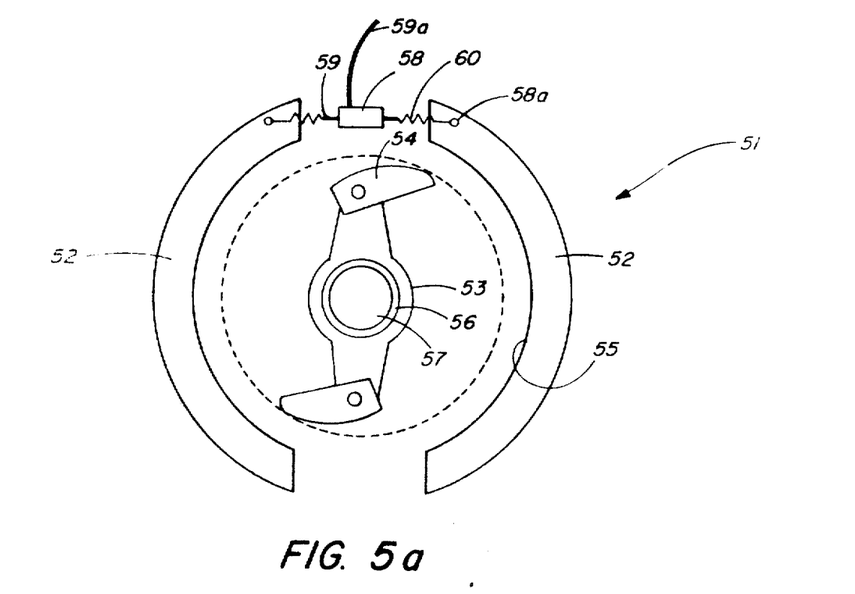
Figure 5B:
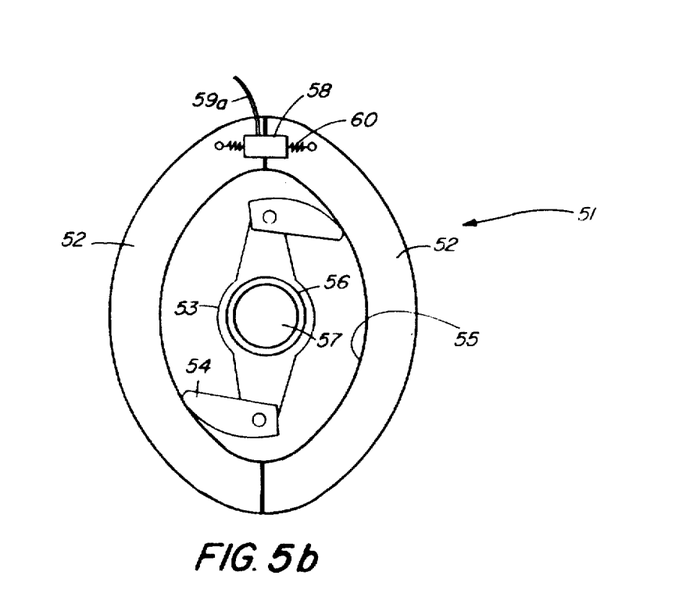

FIGS. 5a and 5b illustrate another embodiment for the use of the coupling as a braking device. In operation, housing 52 is connected in a fixed nonrotational relation to the body or nonrotating axle (not shown) of the device to be slowed, while the input means 56 is connected to a rotatable body having hub 57 (being the member whose restraint from rotation is the object to be accomplished). Rider 54 is pivotally attached to rotor 53 which in turn is fixedly attached to input means 56. In this embodiment of the invention, housing 52 and track 55 are modified by splitting the housing and track into two or more sections. The separate sections are by volitional control brought together or released, by mechanical, hydraulic, or other suitable means as explained below, the movement being towards or away from the axis of rotation of the input means 56. FIG. 5a illustrates the separate sections of housing 52 and track 55 in spaced-apart relation. The means for causing the sections of housing 52 and track 55 to come together can be any suitable means but in FIGS. 5a and 5b, hydraulic means are shown. In this regard, line 59a delivers hydraulic fluid pressure to cylinder 58 causing the outward movement of rods 59. Upon releasing the fluid pressure, rods 59 are retracted causing springs 60 attached to posts 58a to be extended thereby bringing together housing sections 52. The distance from the axial center of the input means 57 to the contact surface of a fully extended arm 54 is less than from the axial center to any point on the track 55 when the sections are sufficiently separated as in FIG. 5a; whereby the braking mechanism is in a released stage. However, when the sections are brought together as shown in FIG. 5b, arm 54 is capable of making contact with any point on track 55.

While housing 52 is separated, input means 56 and pivoting arms 54 rotate freely. Upon bringing the sections of housing 52 together, arms 54 are brought into firm contact with track 55. Since track 55 cannot rotate, the device necessarily avoids the third operative stage described above, i.e., the locking stage, but rather operates in the second stage until the rate of rotation of arms 54 is reduced and the arms fall away from track 55 as a result of the decrease in centrifugal force. At the point in the braking process where arms 54 no longer engage the track 55, conventional brakes may be employed, with minimal danger of locking or fading, to bring input means 56 to a complete stop. While FIGS. 4a, 4b, 4c, 5a and 5b exemplify the use of the novel coupling with a housing having an undulant track situated on its inner surface, those skilled in the art will recognize that similar braking applications can be obtained by modifying in a corresponding manner a coupling of the type shown in FIGS. 10, 11 and 12 having a cam with an undulant track situated on its peripheral surface.

The device may be of overall size suitable for transmitting rotational mechanical power in any quantity, from very slight to very great. The rotor may contain one rider arm or any greater number up to the greatest number for which there is room. The track may contain any number of major and minor arches up to such number as will not allow room for intertial force to be generated. It is preferable for reasons of balance and efficiency that arms be symmetrical in dimension and positioning. In FIGS. 2 and 11, the arms and major arches agree in number and symmetrical positioning, however, other arrangements, such as two (2) or three (3) arms within a track containing four (4) major arches, also gives desirable results.

The size of the mechanism and its parts i.e. the shape, weight and number of rider arms, the size of the undulant track, the shape and number of arches, the amount and characteristics of the lubricant, the size of the rotor, cam and housing may vary, depending upon the load to be moved and the power and speed of rotation of the motor or other power source. In practice, the difference between the radius to the summit of a major arch and the radius to the summit of a minor arch may vary between one-half ($\frac{1}{2}$) of one percent of their average length and ten (10%) percent or more thereof, the choice being dictated principally by size, mass of parts, range of speed of rotation, and load. The amount and/or type of lubricant usually has some effect upon propulsive characteristics. By the term "propulsive characteristics" is meant the work load that the device handles and the conditions upon which the device shifts between its several stages of operation. The term, as used herein, includes also braking characteristics.

Figure 8:
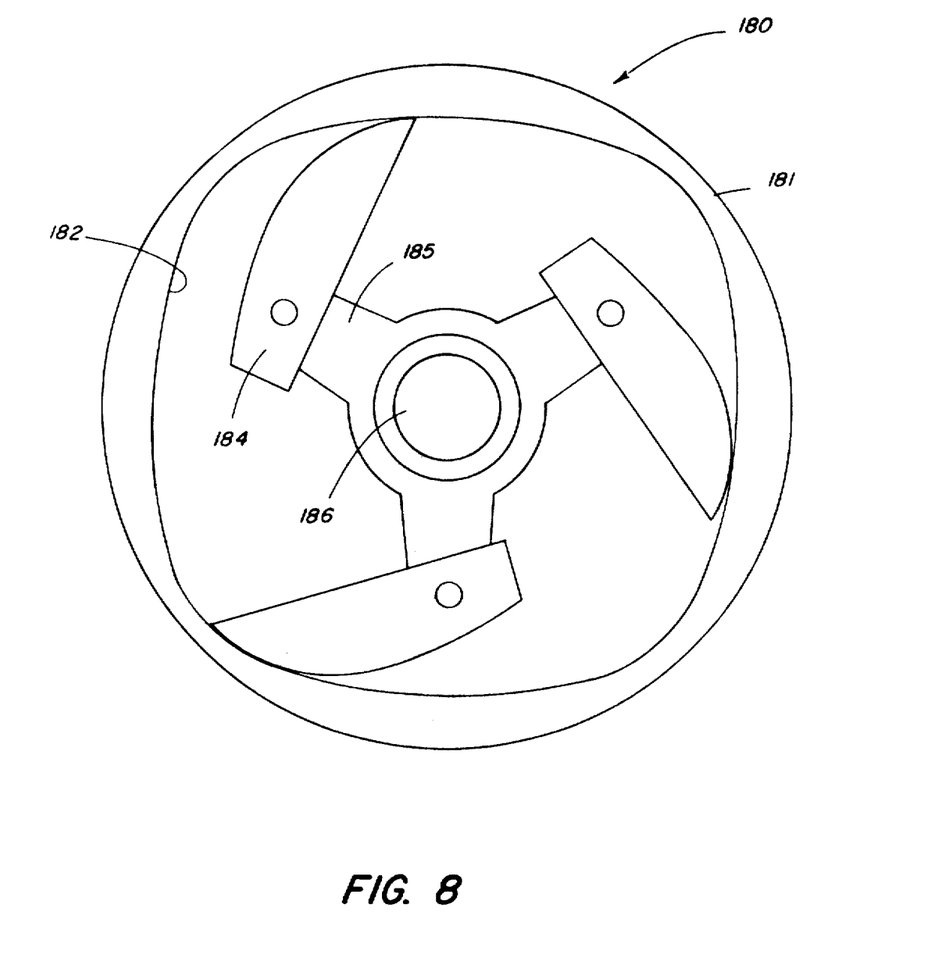
FIG. 8 is an illustration of an embodiment of the coupling of this invention wherein the number of major arches does not agree with the number of rider arms.

As previously mentioned agreement in number and positioning of arms and major arches is not essential to the functioning of the invention. Although, in practice, a certain advantage results from such agreement, another advantage results from a noncorresponding arrangement, the type of arrangement preferred in a particular application being dependent upon the desired propulsive characteristics. Any embodiment in which the number of arms is equal to the number of major arches—or in which one such number is a multiple of the other—and in which the arms and the summits of the major arches are positioned respectively equidistant from each other is referred to herein as a "co-incident" embodiment e.g. four (4) arms equidistant from each other and four (4) major arches with summits equidistant from each other. Any embodiment in which the arms and major arches differ in number and are positioned so that, in the first or second stage of operation, the several arms do not pass the summits of the major arches at the same point in time is referred to herein as a "staggered" embodiment e.g. three (3) arms equidistant from each other, and four (4) major arches with summits equidistant from each other. FIG. 8 illustrates coupling 180 having track 182 which contains four (4) major arches with summits equidistant from each other. FIG. 8 illustrates coupling 180 having track 182 which contains four (4) major arches whose summits are equidistant from each other. The rotor 186 contains three (3) riders 184 attached to three (3) arms 185 which are equidistant from each other.

In a co-incident embodiment, in the first or second stage of operation each arm delivers its peak inertial impulse at the same time as each other arm does so, that is, substantially when each arm passes the summit of a major arch. With the example of a co-incident embodiment described above, in the first or second stage of operation there are four (4) such peak impulses for each revolution of the rotor relative to the track. In a staggered embodiment, in the first or second stage of operation the peak impulses are greater in number but less forceful per impulse, in each revolution of the rotor relative to the track, than in a comparable co-incident embodiment. Thus, with the example of a staggered embodiment described above, in the first or second stage of operation there are twelve (12) peak inertial impulses for each revolution of the rotor relative to the track. The ratio of peak impulses per revolution of the rotor relative to the track, in the first or second stage of operation, as between the above described example of a co-incident embodiment and the above described example of a staggered embodiment is thus four (4) to twelve (12). In the third, locked stage of operation, there is, of course, no distinction in the number of peak impulses as between the two types of embodiments.

The advantage arising from a staggered embodiment is greater smoothness of operation in the first and second stages. The advantage arising from a co-incident embodiment is a disposition to persist longer in the third stage of operation, while subjected to increasing resistance relative to power input, before relapsing into the second stage of operation.

In many examples of a staggered embodiment, the structural inequality may consist of a preponderance in the number of arms over major arches or of major arches over arms. In practice, the total number of either arms or major arches, that can be provided in a single rotational plane, is limited both by availability of space and by the nature of the operation of the device. Where it is desired to achieve extreme smoothness by having a large number of arms and a disparate large number of major arches, the result can be accomplished readily by mounting sets of arms in parallel rotational planes and causing all of the arms to rotate integrally on a single or connected rotor and by enlarging the width of the track to such extent that all of the arms can traverse it simultaneously. In such an embodiment, the arms may be varied in number and/or in circumferential position, as between the arms in one plane of rotation and the arms in other planes of rotation, or the track may be varied in respect to the numbers of major arches, as between the parts thereof traversed by different sets of arms, or both arms and track may be so varied.

A "staggered" effect can likewise be produced by positioning arms in a single plane of rotation other than circumferentially equidistant from each other, even though in the particular assembly the arms and major arches are equal in number.

Another means of varying propulsive characteristics is to construct the cam or housing in two or more segments movable centrifugally toward or centrifugally away from the axis of rotation, with means to control such movements (FIGS. 5a and 5b), thereby constricting or enlarging the track at the choice of the operator. This variant of the device, which may be referred to as a "split track", is especially useful in braking applications as previously discussed.

In addition to alteration of propulsive characteristics attainable by varying the overall size of the assembly and/or its components, propulsive characteristics may also be modified by varying the angulation of the variably extendible arms. The term "angulation" of a variably extendible arm as used herein means the angle formed by the intersection of the following two (2) lines when the mechanism is in its third (locked) stage of operation: (1) a line running from the axial center of the track to the point of contact (or, as the case may be, the midpoint in the contact surface) between the extendible arm and the track; (2) a line running from the said point of contact (or said midpoint in the contact surface) to the axis running through the center of gravity of the extendible arm in a direction perpendicular to the plane of rotation of the rotor and arm assembly. It should be noted that, although a variably extendible arm is usually connected in a fixed relationship with the periphery of the rotor, the angle formed by the two above mentioned lines may nevertheless vary appreciably, depending upon the place in the track with which it happens to be in contact, this being the necessary effect of the variation in length of radii. The term "contact surface" as used herein denotes the portion of the variably extendible arm which is in contact with the surface of the track. Due to the undulation of the track, the precise linear boundaries of the "contact surface" will vary, depending upon the part of the track in contact with the arm.

Figure 7:
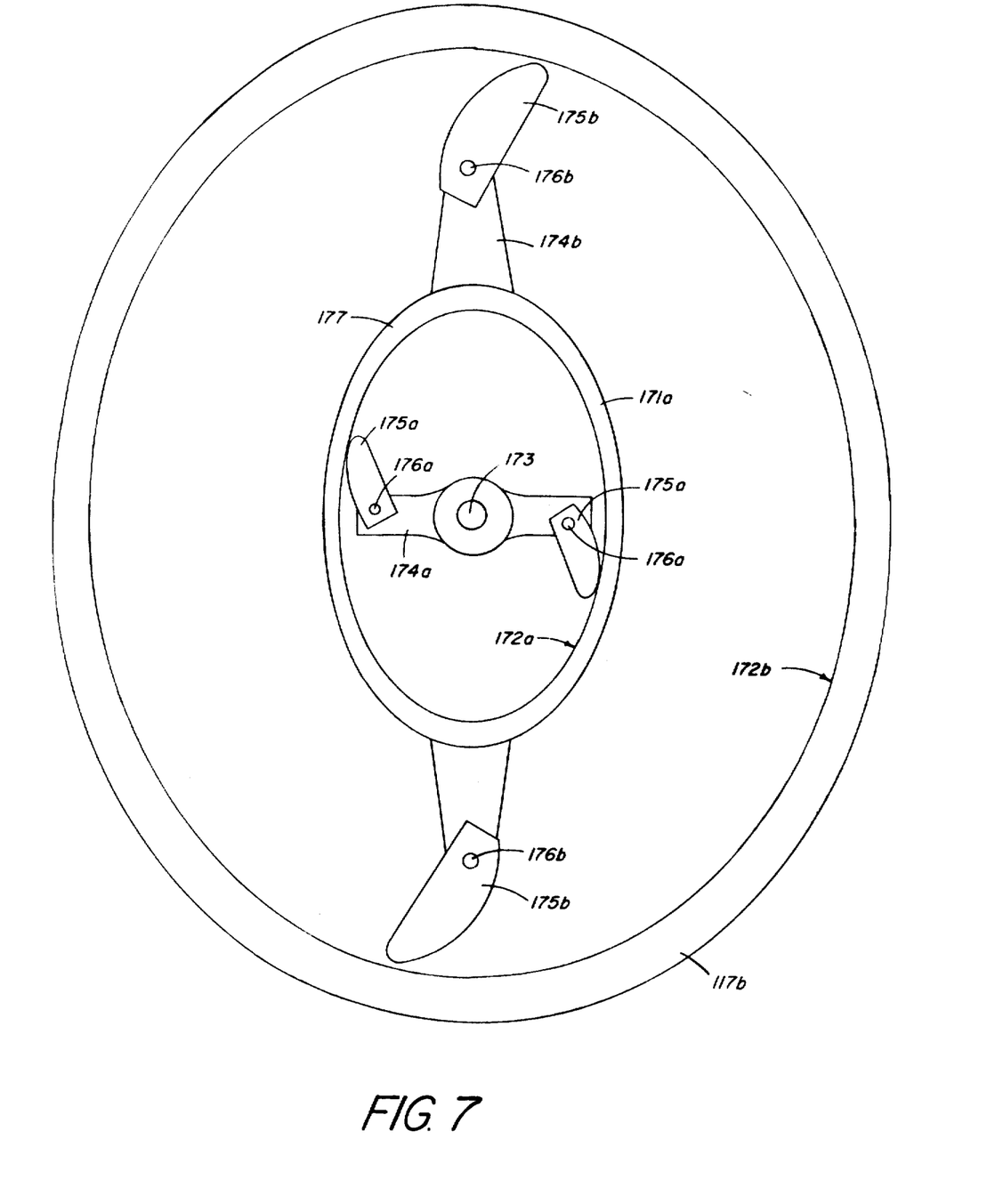
FIG. 7 is a front view of a "piggy back" arrangement using the coupling device of this invention.

Propulsive characteristics can be made selectable within still wider limits by employing a "piggy-back" variant of the device. By "piggy-back" is meant a variant in which there are several housings, all concentric, of graduated size, each housing having an interior undulant track, and each except the largest in the series, having mounted on its exterior surface one or more variably projecting arms capable of making contact with the immediately adjacent larger track. The several tracks may exist substantially in one plane or in different but substantially parallel planes. In the latter case, the arms are designed with longitudinal reach in a line substantially parallel with the axis of rotation, as well as centrifugal reach, to attain contact with the next larger track. In this embodiment, propulsive characteristics are affected by the number of arms and tracks and by their shapes; and no two sets of arms or of tracks existing in different housings need agree in such specification. Selection of the desired propulsion is accomplished by taking output power from the housing of choice. "Piggy-back" coupling 170 of FIG. 7 contains housing 171a, having an inner surface upon which is situated undulant track 172a. Affixed to rotatable power input shaft 173 is rotor 174a having arms 175a pivotally attached thereto by pins 176a. The outer surface 177 of housing 171a has affixed thereto rotor 174b. Arms 175b are pivotally attached to rotor 174b by pins 176b. Housing 171a is contained within housing 171b in a coaxial relationship. The inner surface of housing 171b contains an undulant track 172b. In the operation of "piggy-back" coupling 170, rotation of input shaft 173 causes arms 175a to become extended and contact undulant track 172a. In the third stage of operation, housing 171a rotates integrally in a locked relationship with arms 175a. Rotation of housing 171a in turn causes arms 175b to become extended and contact undulant track 172b. When the third stage of operation is reached, housing 171b rotates integrally in a locked relationship with arms 175b and housing 171a. This embodiment enables the transmission of a wide range of torque over a narrow range of rotational speeds.

The rider arms impart inertial force to, and produce friction with, the track when the arms are subjected to centrifugal or other radial force, and impart such rotative force and friction in quantities bearing some direct relation to the amount of such centrifugal or other force. The centrifugal force can be derived entirely from the rotation of the rotor. The centrifugal force arising from rotation can, however, be supplemented or substituted by one or more of the means mentioned above.

The invention has been described in detail with particular reference to certain preferred embodiments thereof, but it will be understood that variations and modifications can be effected within the spirit and scope of the invention.

I claim:

1. A coupling for transmitting rotational mechanical power comprising:
    (a) a cam having an exterior peripheral surface;
    (b) a circuitous track situated on said exterior peripheral surface of the cam, the linear course of said track being undulant in relation to its axis of rotation;
    (c) a rotatable power input shaft;
    (d) a rotor in communication with the power input shaft such that the rotation of the input shaft causes the rotation of said rotor; and,
    (e) associated with said rotor, means for conveying rotational mechanical power from the input shaft to the undulant track comprising a variably extendible member being capable of making contact with the undulant track at any point in its linear course as a result of centrifugal force causing the extention of said variably extendible member.

* * * * *